C. C. BLAKE.
MECHANICAL MOVEMENT.
APPLICATION FILED AUG. 27, 1913.

1,241,911.  Patented Oct. 2, 1917.

Witnesses

Inventor:
Charles C. Blake
by Charles K. McDermott
his attorney

UNITED STATES PATENT OFFICE.

CHARLES C. BLAKE, OF BROOKLINE, MASSACHUSETTS, ASSIGNOR TO C. C. BLAKE, INCORPORATED, OF BOSTON, MASSACHUSETTS, A CORPORATION OF NEW YORK.

MECHANICAL MOVEMENT.

1,241,911. Specification of Letters Patent. Patented Oct. 2, 1917.

Application filed August 27, 1913. Serial No. 786,909.

*To all whom it may concern:*

Be it known that I, CHARLES C. BLAKE, a citizen of the United States, residing at Brookline, in the county of Norfolk and State of Massachusetts, have invented a new and useful Improvement in Mechanical Movements, of which the following is a specification.

The present invention relates to mechanical movements.

In building machinery it is often desirable to alternately drive and lock a follower through a rotary driver. A common mechanism employed for obtaining this result is the "Geneva" movement. This mechanism comprises a rotary driver provided with a pin which during a single rotation of the driver engages a radial slot formed in the periphery of the follower and imparts thereto one of its feeding steps. When the pin enters the slot it has a minimum pitch velocity. This velocity gradually increases to a maximum as the pin works toward the bottom of the slot and then gradually decreases to the minimum again as the pin emerges from the slot. These differential pitch velocities of the pin subject the parts of "Geneva" movements to great stresses which limit their use to the drive of light duty slow speed mechanisms. It has been proposed to drive heavy duty high speed mechanisms through a "Geneva" movement of exceptionally strong construction but it was found that the limit of speed of the driver thereof was 150 revolutions a minute as at that speed the stresses due to the differential velocities of the pin became so great as to shake the building in which the machine was located. As there are a great number of machines both for light and heavy duty which operate at a speed greatly in excess of 150 revolutions a minute the disability of the "Geneva" movement for use therein seriously handicaps machine designers.

The object of the present invention is the provision of a cheap, simple and compact mechanism which will enable high speed mechanisms to be alternately driven and locked from a rotary driver with certainty and without noise or liability of breakage of parts.

To the accomplishment of this object and such others as may hereinafter appear the various features of the present invention consist in certain devices, combinations and arrangements of parts the advantages of which will be apparent to those skilled in the art.

The various features of the present invention will be best understood from an inspection of the accompanying drawings illustrating the best form of the invention at present devised, in which, Figure 1 is an elevation of the driver and its follower;

Figure 1:
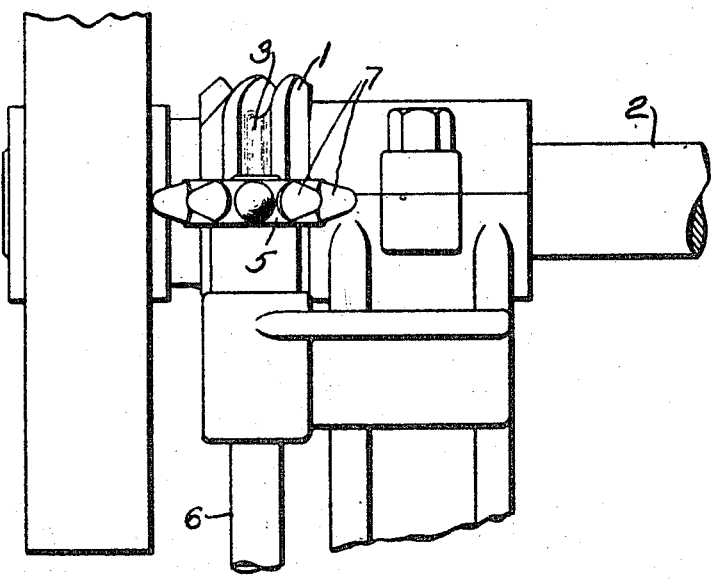
Figure 2:
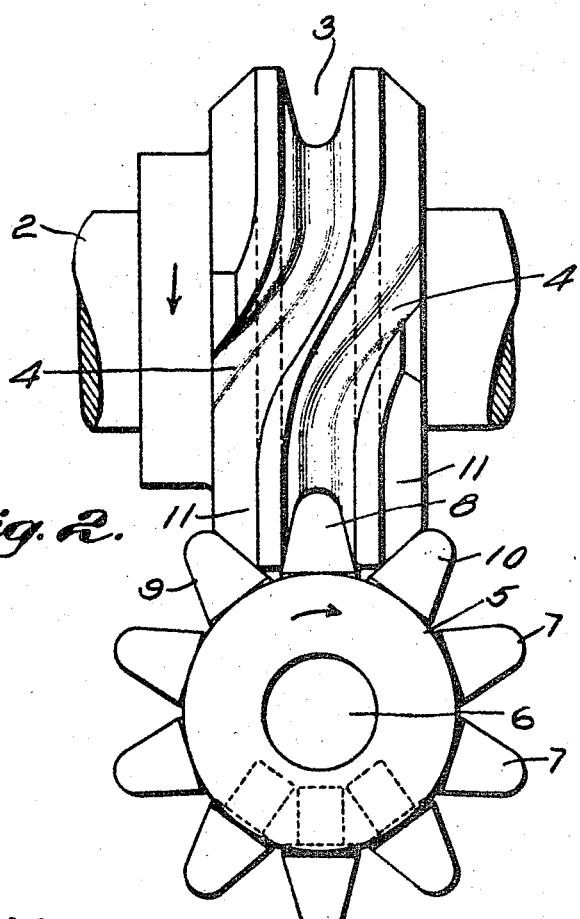
Fig. 2 is an enlarged plan of the driver and its follower.
Figure 3:
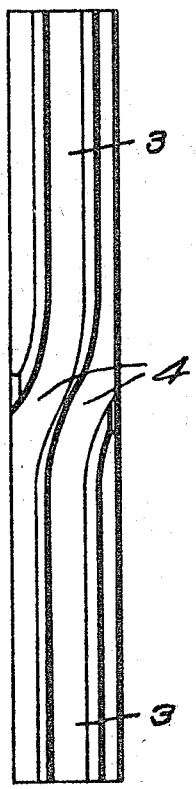
Fig. 3 is a development of the thread on the driver.

In the illustrated embodiment of the invention a driver 1 is mounted on a horizontal shaft 2 which is driven at a high speed from some suitable source of power. The driver 1 is provided with a thread encircling the peripheral edge thereof consisting of a groove 3 arranged for nearly its entire length in a plane normal to the axis of the shaft 2, (Fig. 3 and the dotted lines Fig. 2). The groove 3 at its ends terminates in a pair of oppositely disposed angular bends 4. The walls of the groove in the portion normal to the axis of the shaft 2 have a different inclination than the walls of the groove in the bends 4.

The follower driven by the driver 1 is a wheel 5 mounted upon a vertical shaft 6. The wheel 5 is provided with a series of frusto-conical pins 7 which radiate from the periphery of the wheel. As illustrated in Fig. 2 a tooth 8 is embraced by the groove 3 and the two teeth 9 and 10 adjacent the tooth 8 are engaged by bevels 11 formed on the exterior surface of the thread. The internal surfaces of the groove 3 and the exterior bevels are shaped complemental to the frusto-conical pins so that the teeth 7 are engaged tangentially without lost motion. As the groove 3 for the greater part of its length is arranged in a plane normal to the axis of the shaft 2 it will be apparent that for the greater part of the rotation of the shaft 2 the follower 5 will be locked from movement. During the continued rotation of the driver in the direction of the arrow (Fig. 2) the angular bends 4 engage the pins 8 and 9 and move the follower in the direction of the arrow (Fig. 2) until the pin 9 enters the locking portion of the groove 3 when the follower is again locked. It will be apparent from an inspection of Fig. 2 that during the actuation of the follower only two teeth are engaged by the driver while during the locking of the follower three teeth are engaged thereby and that one of the pins is embraced by the groove throughout a revolution of the driving shaft. It will also be apparent to those skilled in the art that the thread has a uniform pitch velocity during the actuation of the follower.

While the driver has been illustrated and described as being provided with a thread consisting of a groove it will be readily understood that the driver could be provided with a thread consisting of a rib if desired.

It will also be understood that the driver is not limited to rotate in the direction of the arrow (Fig. 2) but that it may rotate in either direction without changing its operation.

It will also be clear to those skilled in the art, with the general objects of the present invention in view, that changes may be made in the details of structure the described and illustrated embodiment thereof being intended as an exploitation of its underlying essentials, the features whereof are definitely stated in their true scope in the claims herewith.

What is claimed as new, is:

1. In a mechanical movement, a driving shaft, a driven shaft, a driver mounted on the driving shaft provided with a groove, arranged for a substantial portion of its length in a plane normal to the axis of the driving shaft, terminating at its ends in oppositely disposed bends, and a wheel mounted on the driven shaft constructed to coöperate with the driver, substantially as described.

2. In a mechanical movement, a driving shaft, a driven shaft, a wheel mounted on the driven shaft provided with frusto-conical pins, and a driver mounted on the driving shaft provided with a groove encircling the peripheral edge thereof arranged, for a substantial portion of its length in a plane normal to the axis of the driving shaft and terminating in oppositely disposed bends, to engage a pin throughout a revolution of the driving shaft, substantially as described.

3. In a mechanical movement, a driving shaft, a driven shaft, a pin wheel mounted on the driven shaft, and a driver mounted on the driving shaft provided with a thread, arranged for a substantial portion of its length in a plane normal to the axis of the driving shaft, terminating at its ends in oppositely disposed bends, two pins at a time being engaged by the bends and three pins at a time by the rest of the thread during the rotation of the driving shaft, substantially as described.

4. In a mechanical movement, a driving shaft, a driven shaft, a wheel mounted on the driven shaft provided with frusto-conical pins, and a driver mounted on the driving shaft provided with a groove arranged, for a substantial portion of its length in a plane normal to the axis of the driving shaft and terminating in oppositely disposed bends, to contact tangentially with one of the pins throughout a revolution of the driving shaft, substantially as described.

5. In a mechanical movement, a driver provided with a groove having a rounded bottom and straight side walls converging toward the bottom of the groove, said groove having an actuating portion and a locking portion.

6. In a mechanical movement, a driving shaft, a driven shaft, a wheel mounted on the driven shaft provided with radial pins, and a driver mounted on the driving shaft provided with a groove encircling the peripheral edge thereof arranged for a substantial portion of its length in a plane normal to the axis of the driving shaft and terminating in oppositely disposed bends, to contact tangentially with the pins, substantially as described.

7. In a mechanical movement, a driving shaft, a driven shaft, a wheel mounted on the driven shaft provided with radial pins, and a driver mounted on the driving shaft provided with a groove encircling the peripheral edge thereof, arranged for a substantial portion of its length in a plane normal to the axis of the driving shaft and terminating in oppositely disposed bends, the internal and external walls of which contact tangentially with the pins, substantially as described.

8. In a mechanical movement, a driving shaft, a driven shaft, a wheel provided with a plurality of frusto-conical radial pins mounted on the driven shaft, and a driver mounted on the driving shaft constructed and arranged to embrace a pin throughout a revolution of the driving shaft to alternately drive and lock the wheel, substantially as described.

9. A machine element having a face and a groove formed in said face extending for a portion of its length in a plane normal to said face and extending for another portion of its length across said plane, the walls of the groove in said portions having different degrees of inclination with relation to said plane, respectively.

CHARLES C. BLAKE.

Witnesses:
CATHERINE L. SULLIVAN,
VIRGINIUS A. MAYER.